United States Patent
Seo et al.

(10) Patent No.: US 12,371,524 B2
(45) Date of Patent: Jul. 29, 2025

(54) METHOD FOR PRODUCING DIENE-BASED GRAFT COPOLYMER RESIN AND DIENE-BASED GRAFT COPOLYMER RESIN

(71) Applicant: LG CHEM, LTD., Seoul (KR)

(72) Inventors: Jae Bum Seo, Daejeon (KR); Dae Woo Lee, Daejeon (KR); Jung Tae Park, Daejeon (KR); Gyu Sun Kim, Daejeon (KR); Ji Uk Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 827 days.

(21) Appl. No.: 17/428,942

(22) PCT Filed: Oct. 6, 2020

(86) PCT No.: PCT/KR2020/013600
§ 371 (c)(1),
(2) Date: Aug. 5, 2021

(87) PCT Pub. No.: WO2021/075779
PCT Pub. Date: Apr. 22, 2021

(65) Prior Publication Data
US 2022/0135725 A1     May 5, 2022

(30) Foreign Application Priority Data
Oct. 14, 2019   (KR) .................. 10-2019-0126954

(51) Int. Cl.
| | |
|---|---|
| C08F 279/04 | (2006.01) |
| B29B 9/06 | (2006.01) |
| B29K 96/02 | (2006.01) |
| B29K 105/00 | (2006.01) |
| C08F 6/00 | (2006.01) |

(52) U.S. Cl.
CPC .............. *C08F 279/04* (2013.01); *B29B 9/06* (2013.01); *C08F 6/001* (2013.01); *B29K 2096/02* (2013.01); *B29K 2105/0085* (2013.01)

(58) Field of Classification Search
CPC .... C08F 279/04; C07C 253/32; C07B 255/08
See application file for complete search history.

(56) References Cited

U.S. PATENT DOCUMENTS

| | | | | |
|---|---|---|---|---|
| 3,833,532 A | * | 9/1974 | Bennett et al. ......... | C08F 36/04 524/836 |
| 3,855,355 A | * | 12/1974 | Moore .................. | C08F 279/04 525/316 |
| 3,880,786 A | * | 4/1975 | Feast ..................... | C08F 279/02 525/262 |
| 4,034,020 A | * | 7/1977 | Moore .................. | C08F 279/04 525/53 |
| 5,250,611 A | | 10/1993 | Baumgartner et al. | |
| 2016/0264703 A1 | | 9/2016 | Jung et al. | |
| 2017/0121501 A1 | | 5/2017 | Trimino et al. | |
| 2017/0260303 A1 | | 9/2017 | Chung et al. | |
| 2018/0030244 A1 | | 2/2018 | Trimino et al. | |
| 2020/0199280 A1 | | 6/2020 | Seo et al. | |
| 2022/0056185 A1 | | 2/2022 | Lam et al. | |

FOREIGN PATENT DOCUMENTS

| | | | |
|---|---|---|---|
| CN | 102050928 | A | 5/2011 |
| CN | 107001544 | A | 8/2017 |
| EP | 3680266 | A1 | 7/2020 |
| JP | 02222407 | A * | 9/1990 |
| KR | 10-0219388 | B1 | 9/1999 |
| KR | 10-2007-0043850 | A | 4/2007 |
| KR | 10-0865407 | B1 | 10/2008 |
| KR | 10-2009-0062488 | A | 6/2009 |
| KR | 10-2012-0078604 | A | 7/2012 |
| KR | 10-2015-0037473 | A | 4/2015 |
| KR | 10-1786149 | B1 | 10/2017 |
| KR | 10-2019-0049292 | A | 5/2019 |
| KR | 1020190068057 | A | 6/2019 |

OTHER PUBLICATIONS

Machine translation of JP 02-222407 (1990, 7 pages).*
"China Fire Protection Handbook," Fire Investigation Fire Criminal Cases, Dec. 31, 2006, vol. 8, p. 348, Shanghai Scientific & Technical Publishers.
Extended European Search Report for related Application No. 20877214.5, mailed Mar. 10, 2022.

* cited by examiner

*Primary Examiner* — Brieann R Johnston

(57) ABSTRACT

The present invention relates to a method for producing a diene-based graft copolymer resin, and a diene-based graft copolymer resin produced therefrom, the method including: mixing an aromatic vinyl-based monomer, a diene-based rubber polymer, and a polymerization initiator to prepare a first reactant; mixing a vinyl cyan-based monomer and an antioxidant to prepare a second reactant; adding and polymerizing the first reactant and the second reactant into a polymerization reactor to prepare a polymer; and removing unreacted monomers in a devolatilization tank.

9 Claims, No Drawings

METHOD FOR PRODUCING DIENE-BASED GRAFT COPOLYMER RESIN AND DIENE-BASED GRAFT COPOLYMER RESIN

The present invention is a National Phase of International Application No. PCT/KR2020/013600 filed on Oct. 6, 2020, which claims the benefit of the priority of Korean Patent Application No. 10-2019-0126954, filed on Oct. 14, 2019, the disclosures of which are incorporated herein in their entirety by reference.

CROSS-REFERENCE TO RELATED APPLICATIONS

The present invention claims the benefit of the priority of Korean Patent Application No. 10-2019-0126954, filed on Oct. 14, 2019, the disclosure of which is incorporated herein in its entirety by reference.

TECHNICAL FIELD

The present invention relates to a method for producing a diene-based graft copolymer resin and a diene-based graft copolymer resin, and more specifically, to a method for producing a diene-based graft copolymer resin, the method being capable of minimizing the occurrence of gel and providing a resin having an excellent color quality, and to a diene-based graft copolymer resin having excellent surface characteristics and an excellent color quality.

BACKGROUND ART

A diene-based graft copolymer resin has excellent processability and excellent physical properties such as surface gloss, impact resistance, and chemical resistance, and thus has been widely used in various office machines, electric and electronic parts, the interior or exterior materials of cars, etc.

Typically, the diene-based graft copolymer resin is produced by a mixing extrusion production method in which a diene-based rubber polymer formed by the emulsion polymerization is emulsion/batch polymerized by adding an aromatic vinyl-based monomer and a vinyl cyan-based monomer, and then a cyanide vinyl-aromatic vinyl-based copolymer is added thereto and mixed and extruded, or by a continuous production method in which all the raw materials are mixed at the same time to prepare reactants and the reactants are continuously polymerized.

However, a diene-based graft copolymer resin produced by a mixing extrusion production method has a limitation in that the surface of a film produced by extruding a resin is not uniform due to the gel caused in the cyanide vinyl-aromatic vinyl-based copolymer to be further added. Further, the diene-based graft copolymer resin produced by a mixing extrusion production method is subjected to a batch polymerization process, and thus has a limitation in that there is a color deviation between lots. In addition, a diene-based graft copolymer resin produced by a continuous production method has a limitation in that the surface of a film produced by extruding a resin is not uniform due to the gel caused in the reactants themselves in which all the raw materials are mixed.

Accordingly, there is a need for a method for producing a diene-based graft copolymer resin which can minimized the occurrence of gel and provide a resin having an excellent color quality.

PRIOR ART DOCUMENTS

[Patent Document]
(Patent Document 1) KR10-1786149B1

DISCLOSURE OF THE INVENTION

Technical Problem

An aspect of the present invention provides a method for producing a diene-based graft copolymer resin, the method being capable of minimizing the occurrence of gel and providing a resin having an excellent color quality.

Another aspect of the present invention provides a diene-based graft copolymer resin having excellent surface characteristics and an excellent color quality.

However, the purpose of the present invention is not limited to the aforementioned, but other purposes not described herein will be clearly understood by those skilled in the art from descriptions below.

Technical Solution

According to an aspect of the present invention, there is provided a method for producing a diene-based graft copolymer resin, the method including: mixing an aromatic vinyl-based monomer, a diene-based rubber polymer, and a polymerization initiator to prepare a first reactant; mixing a vinyl cyan-based monomer and an antioxidant to prepare a second reactant; adding and polymerizing the first reactant and the second reactant into a polymerization reactor to prepare a polymer; and removing unreacted monomers in a devolatilization tank.

According to another aspect of the present invention, there is provided a diene-based graft copolymer resin formed by graft-polymerizing an aromatic vinyl-based monomer and a vinyl cyan-based monomer to a diene-based rubber polymer, wherein the content of vinyl cyan-based dimers in gel obtained by dissolving the diene-based graft copolymer resin in carbon tetrachloride is 1,000 ppm or less.

Advantageous Effects

A method for producing a diene-based graft copolymer resin according to an embodiment of the present invention can minimize the occurrence of gel and provide a diene-based graft copolymer resin having an excellent color quality.

A diene-based graft copolymer resin according to another embodiment of the present invention may have excellent surface characteristics and an excellent color quality.

MODE FOR CARRYING OUT THE INVENTION

Hereinafter, the present invention will be described in more detail to aid in understanding the present invention.

Terms or words used in this specification should not be restrictively interpreted as ordinary meanings or dictionary-based meanings, but should be interpreted as meanings and concepts conforming to the technical spirit of the present invention, based on the principle that an inventor can properly define the concept of a term to explain the invention in the best ways.

Throughout the present specification, when it is described that a portion "comprises" or "includes" some elements, it is not meant as the exclusion of the other components but to implies the further inclusion of the other components, unless explicitly stated to the contrary.

An embodiment of the present invention provides a method for producing a diene-based graft copolymer resin, the method including: mixing an aromatic vinyl-based monomer, a diene-based rubber polymer, and a polymerization initiator to prepare a first reactant; mixing a vinyl cyan-based monomer and an antioxidant to prepare a second reactant; adding and polymerizing the first reactant and the second reactant into a polymerization reactor to prepare a polymer; and removing unreacted monomers in a devolatilization tank.

Hereinafter, a method for producing a diene-based graft copolymer resin according to an embodiment of the present invention will be described in more detail for each step.

1. Preparing First Reactant

An embodiment of the present invention includes mixing an aromatic vinyl-based monomer, a diene-based rubber polymer, and a polymerization initiator to prepare a first reactant. The first reactant may not include a vinyl cyan-based monomer and an antioxidant included in a second reactant which will be described below.

The aromatic vinyl-based monomer may be at least one selected from among styrene, α-methyl styrene, α-ethyl styrene, and p-methyl styrene, and specifically, the aromatic vinyl-based monomer may be styrene.

According to an embodiment of the present invention, the aromatic vinyl-based monomer may be contained in a content of 60-80 parts by weight with respect to 100 parts by weight of the first reactant. Specifically, the aromatic vinyl-based monomer may be contained in a content of 60-75 parts by weight, 70-75 parts by weight, or 70-80 parts by weight with respect to 100 parts by weight of the first reactant. When the content of the aromatic vinyl-based monomer is within the above range, the reactant may have viscosity suitable for producing a polymer, and rubber particles may be well formed from a diene-based rubber polymer in the polymerization reaction, thereby providing a diene-based graft copolymer resin having excellent impact strength.

The diene-based rubber polymer may be a polymer of a diene-based monomer, the diene-based monomer may be at least one selected from among 1,3-butadiene, isoprene, chloroprene, and piperylene, and specifically, the diene-based monomer may be 1,3-butadiene.

According to an embodiment of the present invention, the diene-based rubber polymer may be contained in a content of 5-20 parts by weight with respect to 100 parts by weight of the first reactant. Specifically, the diene-based rubber polymer may be contained in a content of 5-10 parts by weight with respect to 100 parts by weight of the first reactant. When the content of the diene-based rubber polymer is within the above range, rubber particles may be well formed in the polymerization reaction, thereby providing a diene-based graft copolymer resin having excellent impact strength, tensile strength, etc.

The polymerization initiator may be at least one selected from among t-butylperoxy-2-ethylhexanoate, azobisisobutyronitrile, benzoyl peroxide, cumyl peroxide and t-butyl peroxide, 1,1-di(t-butylperoxy)cyclohexane, and specifically, the polymerization initiator may be t-butylperoxy-2-ethylhexanoate.

The polymerization initiator may be contained in a content of 0.01-0.1 parts by weight, or 0.01-0.05 parts by weight with respect to 100 parts by weight of the first reactant. When the content of the polymerization initiator is within the above range, the polymerization may be easily carried out.

According to an embodiment of the present invention, the first reactant may further include a reaction solvent. In this case, the first reactant may be prepared by adding and completely dissolving the aromatic vinyl-based monomer and the diene-based rubber polymer in the reaction solvent, adding the polymerization initiator thereto, and then mixing the same.

In the present invention, the reaction solvent may be at least one selected from among ethylbenzene, toluene, xylene, and methylethylketone, and specifically, the reaction solution may be ethylbenzene.

According to an embodiment of the present invention, the reaction solvent may be contained in a content of 10-30 parts by weight with respect to 100 parts by weight of the first reactant. Specifically, the reaction solution may be contained in a content of 10-20 parts by weight, 15-25 parts by weight, or 15-30 parts by weight with respect to 100 parts by weight of the first reactant. When the content of the reaction solution is within the above range, the first reactant may have suitable viscosity and the polymerization reaction may be easily carried out.

The first reactant may further include a molecular weight control agent. The molecular weight control agent may be at least one selected from among t-dodecyl mercaptan, n-dodecyl mercaptan, n-octyl mercaptan and α-methylstyrene dimer, and specifically, may be at least one selected from among t-dodecyl mercaptan and α-methylstyrene dimer.

The molecular weight control agent may be contained in a content of 0.01-0.1 parts by weight, or 0.01-0.05 parts by weight with respect to 100 parts by weight of the first reactant. When the content of the molecular weight control agent is within the above range, the molecular weight control agent may serve as a reaction accelerator while maintaining the polymerization rate appropriately.

2. Preparing Second Reactant

An embodiment of the present invention includes mixing a vinyl cyan-based monomer and an antioxidant to prepare a second reactant.

In an embodiment of the present invention, all the raw materials are not mixed at the same time to prepare a reactant, but the second reactant including the vinyl cyan-based monomer and the antioxidant is prepared as a separate reactant and separately added, and thus gel, which may be formed during the production of a diene-based graft copolymer resin, may be minimized. Accordingly, a method for producing a diene-based graft copolymer resin according to an embodiment of the present invention can provide a diene-based graft copolymer resin having excellent surface characteristics and an excellent color quality.

In addition, an embodiment of the present invention the antioxidant is included in the second reactant, and thus the diene-based graft copolymer resin having an excellent color quality can be provided, and even when gel is formed, the content of the vinyl cyan-based dimer in the gel is little, and thus the diene-based graft copolymer resin having excellent surface characteristics can be provided.

As a specific example, the vinyl cyan-based monomer may be transformed into a dimer or a multimer because the vinyl cyan-based monomer may generate radicals from a vinyl group in the presence of heat and oxygen even while not participating in the polymerization reaction. In addition, in the vinyl cyan-based dimer or vinyl cyan-based multimer thus dimerized or multimerized, cyanide groups may cause a chain radical reaction in the presence of other radicals, and thus a derivative having a ring formed between cyanide groups in the vinyl cyan-based dimer or vinyl cyan-based multimer. If the dimer or multimer of these vinyl cyan-based monomers remains in the polymerization system, and participates in the polymerization reaction in the form of dimer or multimer, or the dimer or multimer remains in a resin, the dimer or multimer yellows the resin, thereby causing a color deviation between lots.

On the other hand, according to an embodiment of the present invention, in the case of including the antioxidant in the second reactant, when radicals are generated in the vinyl cyan-based monomer in the presence of heat and oxygen as above, the antioxidant may be induced to serve as a scavenger which can capture the generated radicals. That is, the second reactant according to an embodiment of the present invention includes the vinyl cyan-based monomer and the antioxidant at the same time, and thus even though the vinyl cyan-based monomer is exposed to heat and oxygen, the antioxidant captures radicals generated from the vinyl cyan-based monomer to prevent the dimerization and/or multimerization of the vinyl cyan-based monomer and induce the vinyl cyan-based monomer so as to fully participate in the polymerization reaction, thereby preventing the yellowing of the resin. Thus, the color deviation between lots may be significantly reduced.

According to an embodiment of the present invention, the antioxidant may be contained in a content of 0.1-1.0 parts by weight with respect to 100 parts by weight of the vinyl cyan-based monomer. When the content of the antioxidant is within the above range, the occurrence of gel may be minimized, and a diene-based graft copolymer resin having an excellent color quality may be produced.

The vinyl cyan-based monomer may be at least one selected from among acrylonitrile, methacrylonitrile, phenylacrylonitrile and α-chloroacrylonitrile, and specifically, the vinyl cyan-based monomer may be acrylonitrile.

The antioxidant is not particularly limited as long as it can be used in the production of a diene-based graft copolymer resin, but as a specific example, when radicals are generated in the vinyl cyan-based monomer in the presence of heat and oxygen as above, the antioxidant may be at least one selected from the group consisting of antioxidants which can serve as a scavenger capturing radicals. More specifically, the antioxidant may be at least one selected from the group consisting of a hindered phenol-based antioxidant, a phosphorus-based antioxidant, etc. which can be used in the production of a copolymer resin.

3. Preparing Polymer

An embodiment of the present invention includes adding and polymerizing the first reactant and the second reactant into a polymerization reactor to prepare a polymer.

An embodiment of the present invention may minimize gel which can be formed during the production of a diene-based graft copolymer resin by preparing the first reactant and the second reactant separately and adding the same into the polymerization reactor.

The preparing of the polymer, for example, may continuously prepare a polymer by continuously adding the first reactant and the second reactant at a rate of 8-10 kg/hr and 2-3 kg/hr, respectively, and polymerizing the first reactant and the second reactant. In this case, a diene-based graft copolymer resin having an excellent color quality may be produced. That is, the color deviation between lots may be minimized.

According to an embodiment of the present invention, the weight ratio of the first reactant and the second reactant which are added to the polymerization reactor may be 3:1 to 5:1. Specifically, the weight ratio of the first reactant and the second reactant which are added to the polymerization reactor may be 3:1 to 4.3:1, 3.4:1 to 4.3:1, 3.4:1 to 5:1, 4:1 to 4.3:1 or 4.2:1 to 5:1. When the weight ratio of the first reactant and the second reactant which are added to the polymerization reactor is within the above range, the polymerization stability may be excellent and the polymerization conversion ratio may increase.

4. Removing Unreacted Monomers

An embodiment of the present invention includes removing unreacted monomers in a devolatilization tank. This is for removing impurities other than the diene-based graft copolymer resin. Meanwhile, when a reaction solvent is further included in the first reactant, the reaction solvent may be removed together with the unreacted monomers when the unreacted monomers are removed in the devolatilization tank.

The removing of the unreacted monomers may be carried out at a temperature of 200-250° C. and under a pressure of 5-30 torr. In this case, impurities other than the diene-based graft copolymer resin may be removed effectively.

The method for producing a diene-based graft copolymer resin according to an embodiment of the present invention may further include excluding the diene-based graft copolymer resin, and thus a pellet-type diene-based graft copolymer resin may be produced.

According to another aspect of the present invention, there is provided a diene-based graft copolymer resin formed by graft-polymerizing an aromatic vinyl-based monomer and a vinyl cyan-based monomer to a diene-based rubber polymer, wherein the content of vinyl cyan-based dimers in gel obtained by dissolving the diene-based graft copolymer resin in carbon tetrachloride is 1,000 ppm or less. Specifically, 2 g of the diene-based graft copolymer resin may be dissolved in 10 ml of carbon tetrachloride for 4 hours, 30 ml of methanol may be added thereto to precipitate a polymer, and then the supernatant may be taken and analyzed by gel-chromatography, and thus the content of the vinyl cyan-based dimer in the gel may be confirmed. The content of the vinyl cyan-based dimer in the gel may be particularly, 500 ppm or less, 250 ppm or less, 240 ppm or less, or 236 ppm or less. When the content of the vinyl cyan-based dimer in the gel is within the above range, the surface of a film prepared by extruding a resin may be uniform. In addition, when the content of the vinyl cyan-based dimer formed by cyclization between the vinyl cyan-based monomers is within the above range, thermal discoloration is prevented, and thus the color quality of the diene-based graft copolymer resin may be excellent.

The aromatic vinyl-based monomer may be at least one selected from among styrene, α-methyl styrene, α-ethyl styrene, and p-methyl styrene, and specifically, the aromatic vinyl-based monomer may be styrene.

The diene-based rubber polymer may be a polymer of a diene-based monomer, the diene-based monomer may be at least one selected from among 1,3-butadiene, isoprene, chloroprene, and piperylene, and specifically, the diene-based monomer may be 1,3-butadiene.

The vinyl cyan-based monomer may be at least one selected from among acrylonitrile, methacrylonitrile, phenylacrylonitrile and α-chloroacrylonitrile, and specifically, the vinyl cyan-based monomer may be acrylonitrile.

According to an embodiment of the present invention, the content of a vinyl cyan-based compound containing the vinyl cyan-based monomer and the vinyl cyan-based dimer in the gel, which are obtained by dissolving the diene-based graft copolymer resin in toluene, may be 20 wt % or less. Specifically, 0.5 g of the diene-based graft copolymer resin may be dissolved in 40 g of toluene for 4 hours, sol and gel may be separated by using a centrifuge, and then the obtained gel may be analyzed by FT-IR, and thus the content of the vinyl cyan-based compound in the gel may be confirmed. The content of the vinyl cyan-based compound in the gel, which is obtained by dissolving the diene-based graft copolymer resin in toluene, may be, particularly, 15 wt % or less, 11 wt % or less, 10.5 wt % or less, or 10.3 wt % or less. When the content of the vinyl cyan-based compound in the gel, which is obtained by dissolving the diene-based graft copolymer resin in toluene, is within the above range, the surface of a film prepared by extruding a resin may be uniform. In addition, the thermal discoloration due to the cyclic formation between the vinyl cyan-based monomers may be prevented, and thus the color quality of the diene-based graft copolymer resin may be excellent.

According to an embodiment of the present invention, the diene-based graft copolymer resin may have a color b value of −6 to −2. Specifically, the diene-based graft copolymer resin may have a color b value of −6 to −3.6 or −3.6 to −2. When the color b value of the diene-based graft copolymer resin is within the above range, the diene-based graft copolymer resin may be white. Accordingly, the diene-based graft copolymer resin may have an excellent color quality.

Hereinafter, the present invention will be described in more detail according to examples. However, examples according to the present invention may be modified in various other forms, and the scope of the present invention should not be interpreted to be limited to the examples described below. Rather, the examples of the present specification are provided so that this description will be thorough and complete, and will fully convey the scope of the present invention to those skilled in the art.

Example 1

Ethylbenzene (Sigma-Aldrich) 18.6 parts by mass as a reaction solvent, styrene monomers (Sigma-Aldrich) 71.5 parts by mass, butadiene rubber (730AX, Asahi) 9.9 parts by mass, t-butylperoxy-2-ethylhexanoate (Sigma-Aldrich) 0.037 parts by mass as an initiator, and t-dodecyl mercaptan (Sigma-Aldrich) 0.037 parts by mass as a molecular weight control agent were mixed to prepare a first reactant, and acrylonitrile monomers (Sigma-Aldrich) 100 parts by mass and Irganox 1076 (Songwon Industrial) 0.52 parts by mass as an antioxidant were mixed to prepare a second reactant.

The first reactant and the second reactant were continuously added into a polymerization reactor at a rate of 9.7 kg/hr and 2.3 kg/hr, respectively, and were polymerized to continuously prepare a polymer.

The obtained polymer was transferred to a devolatilization tank, unreacted monomers and the reaction solvent were removed at a temperature of 23° C. under a pressure of 10 torr, and the polymer was die-cut to produce a pellet-type acrylonitrile-butadiene-styrene copolymer resin.

Example 2

A pellet-type acrylonitrile-butadiene-styrene copolymer resin was produced by performing the same manner as in Example 1 except that the first reactant and the second reactant were continuously added into a polymerization reactor at a rate of 9.3 kg/hr and 2.7 kg/hr, respectively.

Example 3

A pellet-type acrylonitrile-butadiene-styrene copolymer resin was produced by performing the same manner as in Example 1 except that Irganox 1010 (Songwon Industrial) as an antioxidant was mixed in the same content as above instead of Irganox 1076 (Songwon Industrial) when the second reactant was prepared.

Example 4

A pellet-type acrylonitrile-butadiene-styrene copolymer resin was produced by performing the same manner as in Example 1 except that Songnox 11B (Songwon Industrial) as an antioxidant was mixed in to the same content as above instead of Irganox 1076 (Songwon Industrial) when the second reactant was prepared.

Comparative Example 1

Ethylbenzene 15.0 parts by mass as a reaction solvent, styrene monomers (Sigma-Aldrich) 57.8 parts by mass, acrylonitrile monomers 19.2 parts by mass, polymerizing rubber 8.0 parts by mass, t-butylperoxy-2-ethylhexanoate 0.03 parts by mass as an initiator, t-dodecyl mercaptan 0.03 parts by mass as a molecular weight control agent, and Irganox 1076 0.1 parts by mass as an antioxidant were mixed to prepare a reactant.

The reactant was continuously added into a polymerization reactor at a rate of 12 kg/hr, and was polymerized to continuously prepare a polymer.

The obtained polymer was transferred to a devolatilization tank, unreacted monomers and the reaction solvent were removed at a temperature of 23° C. under a pressure of 10 torr, and the polymer was die-cut to produce a pellet-type acrylonitrile-butadiene-styrene copolymer resin.

Comparative Example 2

A pellet-type acrylonitrile-butadiene-styrene copolymer resin was produced by performing the same manner as in Example 1 except that Irganox 1076 (Songwon Industrial) as an antioxidant was not added when the second reactant was prepared.

Experimental Examples

To perform a comparative analysis of characteristics of each resin produced in Examples 1 to 4 and Comparative Examples 1 and 2 above, the analysis below was carried out, and the results are shown in Table 1 below.

1) Confirmation of Number of Gels

Each resin produced in Examples 1 to 4 and Comparative Examples 1 and 2 above was made into a film having a thickness of 20 μm, a width of 0.03 m, a length of 3.33 m by using a film extruder (Polylab, HAAKE Co.), and then the number of protruding foreign substances in the film was measured to confirm the number of gels.

2) Confirmation of Content of Acrylonitrile Compound

Each resin 0.5 g produced in Examples 1 to 4 and Comparative Examples 1 and 2 above was dissolved in 40 g of toluene (Sigma-Aldrich) for 4 hours, sol and gel were separated by using a centrifuge (Sorvall RC-6, Kendro), and then the obtained gel was analyzed by FT-IR, and thus the content of an acrylonitrile compound in the gel was confirmed.

3) Measurement of Color b Value

The color b values of the resins produced in Examples 1 to 4 and Comparative Examples 1 and 2 above were measured by using a color difference meter (Hunter Lab).

4) Confirmation of Content of Acrylonitrile Dimer

Each resin 2 g produced in Examples 1 to 4 and Comparative Examples 1 and 2 above was dissolved in 10 ml of toluene (Sigma-Aldrich) for 4 hours, 30 ml of methanol (Sigma-Aldrich) was added to precipitate a polymer, and then the supernatant was taken and analyzed by gel-chromatography, and thus the content of an acrylonitrile dimer in the gel was confirmed.

TABLE 1

| Division | Example 1 | Example 2 | Example 3 | Example 4 | Comparative Example 1 | Comparative Example 2 |
|---|---|---|---|---|---|---|
| Number of gels | 21 | 34 | 23 | 26 | 67 | 28 |
| Content of acrylonitrile compound (%, Gel) | 10.3 | 11.9 | 11.7 | 12.3 | 24.6 | 10.9 |
| Color b value | −3.6 | −3.1 | −3.2 | −3.1 | −1.5 | 1.7 |
| Content of acrylonitrile dimer (ppm) | 236 | 258 | 249 | 268 | 1,027 | 1,346 |

Referring to Table 1, it may be confirmed that the acrylonitrile-butadiene-styrene copolymer resins of Examples 1 to 4 produced by a method including mixing the acrylonitrile monomer and the antioxidant to prepare the second reactant as a separate reactant has not only even fewer number of gels than those of the resin of Comparative Example 1 produced by a method including mixing all the raw materials at the same time to prepare a reactant, but also contains less content of the acrylonitrile compound in the gel and less content of the acrylonitrile dimer in the gel. In addition, when the color b value is −6 to −2, the resin is white, and when the color b value is −2 or more, the resin becomes yellow. The resins of Examples 1 to 4 have color b values of −3.6, −3.1, −3.2, and −3.1, respectively, and the resin of Comparative Example 1 has a color b value of −1.5. Thus, it can be seen that the resins of Examples 1 to 4 has superior color quality to the resin of Comparative Example 1.

Further, it may be confirmed that the resin of Example 1 has excellent surface characteristics because of fewer number of gels, less content of the acrylonitrile compound in the gel, and less content of the acrylonitrile dimer in the gel than those of the resin of Comparative Example 2 produced without adding an antioxidant to the second reactant. In addition, it may be confirmed that the resin of Example 2 contains a lot less content of the acrylonitrile dimer in the gel than that of the resin of Comparative Example 2. Further, it may be confirmed that the resins of Examples 3 and 4 has a lot fewer number of gels and contains far less content of the acrylonitrile dimer in the gel than those of the resin of Comparative Example 2. Moreover, from the color b values, it may be seen that the resins of Examples 1 to 4 has superior color quality to the resin of Comparative Example 2.

Thus, it may be seen that a method for producing a diene-based graft copolymer resin according to an embodiment of the present invention can not only minimize the occurrence of gel but also provide a diene-based graft copolymer resin having an excellent color quality.

The invention claimed is:

1. A method for producing a diene-based graft copolymer resin, the method comprising:
    mixing an aromatic vinyl-based monomer, a diene-based rubber polymer, and a polymerization initiator to prepare a first reactant;
    mixing a vinyl cyan-based monomer and an antioxidant to prepare a second reactant;
    adding and polymerizing the first reactant and the second reactant into a polymerization reactor to prepare a polymer; and
    removing unreacted monomers in a devolatilization tank,
    wherein with respect to 100 parts by weight of the first reactant, the aromatic vinyl-based monomer is contained in a content of 60-80 parts by weight, the diene-based rubber polymer is contained in a content of 5-20 parts by weight, and the polymerization initiator is contained in a content of 0.01-0.1 parts by weight,
    wherein the antioxidant is contained in a content of 0.1-1.0 parts by weight with respect to 100 parts by weight of the vinyl cyan-based monomer,
    wherein the antioxidant is at least one selected from the group consisting of a hindered phenol-based antioxidant and a phosphorus-based antioxidant.

2. The method of claim 1, wherein the weight ratio of the first reactant and the second reactant which are added to the polymerization reactor is 3:1 to 5:1.

3. The method of claim 1, wherein the first reactant further comprises a reaction solvent, and
    the reaction solvent is contained in a content of 10-30 parts by weight with respect to 100 parts by weight of the first reactant.

4. The method of claim 1, further comprising extruding the diene-based graft copolymer resin, wherein the diene-based graft copolymer resin is in the form of a pellet.

5. The method of claim 1, wherein the content of vinyl cyan-based dimers in a gel obtained by dissolving the diene-based graft copolymer resin in carbon tetrachloride is 1,000 ppm or less.

6. The method of claim 1, wherein the content of vinyl cyan-based dimers in a gel obtained by dissolving the diene-based graft copolymer resin in carbon tetrachloride is 500 ppm or less.

7. The method of claim 5, wherein the content of a vinyl cyan-based compound containing the vinyl cyan-based monomer and the vinyl cyan-based dimer in the gel, which are obtained by dissolving the diene-based graft copolymer resin in toluene, is 20 wt % or less.

8. The method of claim 1, wherein the diene-based graft copolymer resin has a color b value of −6 to −2.

9. The method of claim 1, wherein the diene-based rubber polymer is contained in a content of 5-10 parts by weight with respect to 100 parts by weight of the first reactant.

* * * * *